(12) United States Patent
Ueno

(10) Patent No.: US 6,243,126 B1
(45) Date of Patent: Jun. 5, 2001

(54) IMAGE FORMING APPARATUS IN WHICH A LASER BEAM IS APPLIED FROM A SEMICONDUCTOR LASER TO SCAN AN IMAGE CARRIER, AND METHOD OF CONTROLLING THE APPARATUS

(75) Inventor: Sueo Ueno, Kawasaki (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/521,954

(22) Filed: Mar. 9, 2000

(51) Int. Cl.$^7$ ................................................... B41J 2/435
(52) U.S. Cl. ......................................... 347/248; 347/234
(58) Field of Search ........................................ 347/234, 235, 347/250, 248; 369/44.11, 44.23, 44.29, 44.28; 250/201.2, 206.1, 235, 230; 346/107.3, 107.5; 396/217

(56) References Cited

U.S. PATENT DOCUMENTS

| 4,870,632 | * | 9/1989 | Shiono et al. ................ 369/44.23 |
| 5,396,477 | * | 3/1995 | Matsumoto et al. ......... 369/44.28 |
| 5,883,385 | * | 3/1999 | Takahashi et al. ............ 250/235 |
| 5,929,891 | * | 7/1999 | Komiya et al. ................ 347/235 |

FOREIGN PATENT DOCUMENTS 5-66354    3/1993    (JP) .

* cited by examiner

Primary Examiner—N. Le
Assistant Examiner—Hai C. Pham
(74) Attorney, Agent, or Firm—Foley & Lardner

(57) ABSTRACT

An image carrier is scanned with a laser beam emitted by a semiconductor laser. Part of the laser beam is focused on a photoelectric converter immediately before it scans the image carrier. The laser beam position is adjusted in a direction perpendicular to the laser beam scanning direction in accordance with the output from the photoelectric converter.

4 Claims, 9 Drawing Sheets

IMAGE FORMING APPARATUS IN WHICH A LASER BEAM IS APPLIED FROM A SEMICONDUCTOR LASER TO SCAN AN IMAGE CARRIER, AND METHOD OF CONTROLLING THE APPARATUS

BACKGROUND OF THE INVENTION

An image forming apparatus such as an electronic copying machine, facsimile, or printer forms an electrostatic latent image on the surface of a photosensitive drum serving as an image carrier by scanning that surface. The apparatus visualizes the electrostatic latent image with a developer mix (toner), and transfers the image onto a sheet.

A laser beam emitted by a laser diode strikes a galvanomirror, and is reflected by it to strike a polygon mirror. The laser beam having struck the polygon mirror strikes the polygon mirror, and is reflected by it to scan the surface of the photosensitive drum axially along the photosensitive drum as the polygon mirror pivots. Axial scanning of the photosensitive drum is called main scanning. This main scanning is repetitively executed with rotation of the photosensitive drum. The moving direction (direction perpendicular to the main scanning direction) of each main scanning repeated on the photosensitive drum is called a subscanning direction.

The laser beam position in the subscanning direction is important in forming a high-quality image, and can be adjusted by the galvanomirror. However, the laser beam position in the sub-scanning direction, which has been adjusted once, may vary owing to vibrations and the like.

BRIEF SUMMARY OF THE INVENTION

It is an object of the present invention to provide an image forming apparatus with high reliability that can always automatically adjust the laser beam position to an optimal position in a direction perpendicular to a scanning direction, thereby always forming a high-quality image with fine finish, and a method of controlling the apparatus.

According to the present invention, an image forming apparatus for scanning an image carrier with a laser beam emitted by a semiconductor laser, comprises an adjuster for adjusting a position of the laser beam in a direction perpendicular to the scanning direction, an optical unit for focusing onto one point part of the laser beam immediately before it scans the image carrier, a photoelectric converter arranged at a position where the laser beam is brought to a focus by the optical unit, and control means for controlling the adjuster in accordance with an output from the photoelectric converter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

[1] The first embodiment will be described below.

Figure 1:
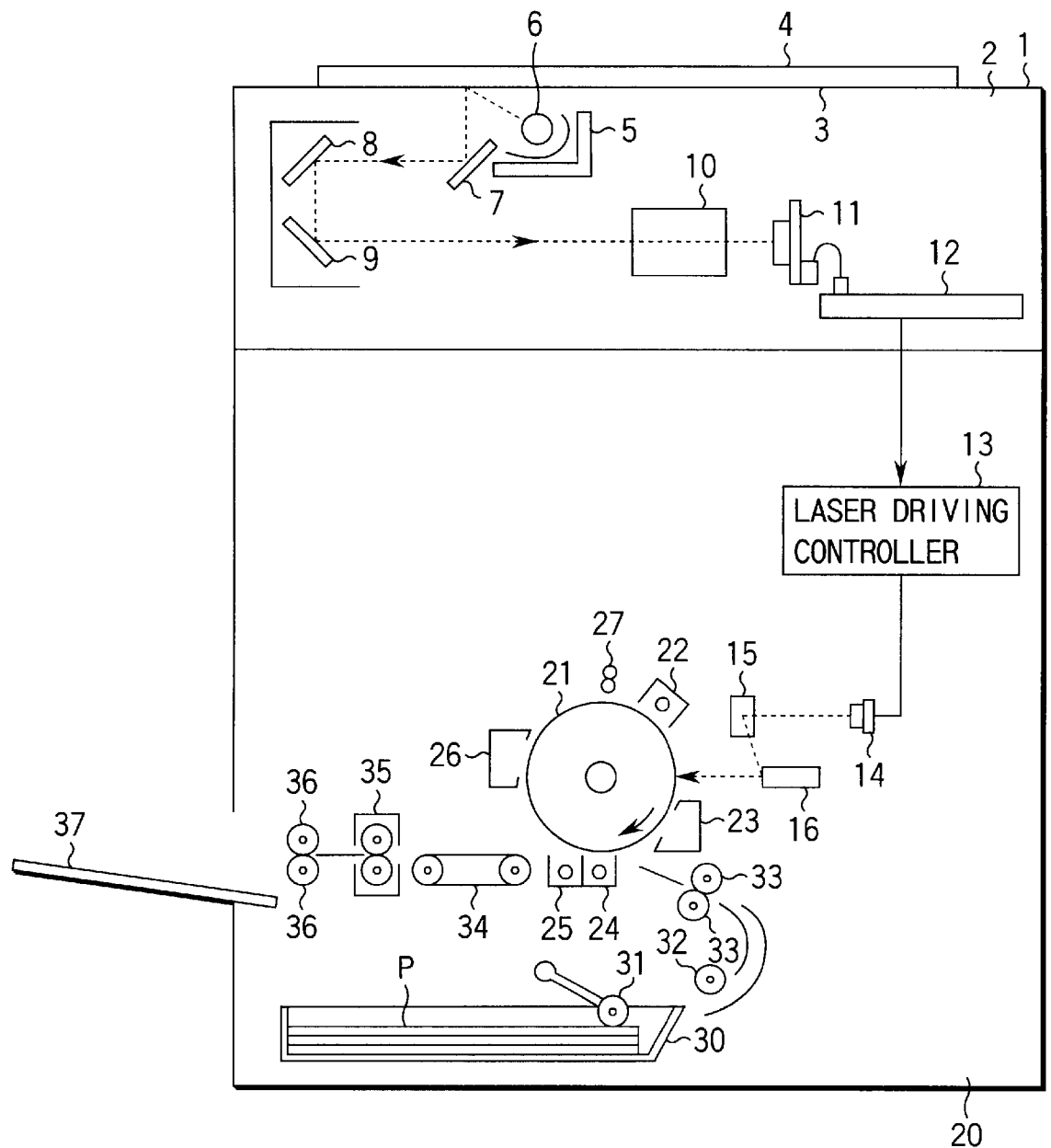
FIG. 1 is a view showing the whole arrangement of each embodiment.

FIG. 1 shows the main body of an image forming apparatus, e.g., electronic copying machine. The electronic copying machine comprises a scanner 2 and printer 20.

An original table 3 for placing an original is set on top of the scanner 2, and an original cover 4 is attached to the original table 3 to freely open/close.

A carriage 5 is reciprocally arranged below the original table 3. The carriage 5 has an exposure lamp 6. While the exposure lamp 6 is turned on, the carriage 5 reciprocates to optically scan the entire surface of the original table 3.

By this optical scanning, a reflected light image of an original on the original table 3 is obtained. The reflected light image is projected on a CCD sensor 11 via reflecting mirrors 7, 8, and 9 and a variable-magnification lens block 10. The CCD sensor 11 outputs an image signal of a voltage level corresponding to the light reception amount. This image signal is sent to an image processor 12. The image processor 12 performs a series of image processes such as shading correction and gamma correction for the image signal, thereby outputting image data corresponding to an image to be formed (image on the original). The image data is supplied to a laser driving controller 13 in the printer 20.

The laser driving controller 13 drives a semiconductor laser, e.g., laser diode 14 in accordance with the image data. The laser diode 14 emits a laser beam.

The laser beam emitted by the laser diode 14 strikes an adjuster, e.g., galvanomirror 15, and is reflected by it to strike a polygon mirror 16. The laser beam having struck the polygon mirror 16 is reflected by it, and scans the surface of an image carrier, e.g., photosensitive drum 21 axially along the photosensitive drum 21 as the polygon mirror 16 pivots. Axial scanning of the photosensitive drum 21 is called main scanning. This main scanning is repetitively executed with rotation of the photosensitive drum 21. The moving direction (direction perpendicular to the main scanning direction) of each main scanning repeated on the photosensitive drum 21 is called a subscanning direction.

A charger 22, developing unit 23, transfer unit 24, peeling unit 25, cleaner 26, and charge remover 27 are sequentially arranged around the photosensitive drum 21. A sheet feed cassette 30 is disposed below the photosensitive drum 21.

The sheet feed cassette 30 stores many copying sheets P. These sheets P are picked up by a pickup roller 31 one by one. The picked sheet P is separated from the sheet feed cassette 30 by a separator 32, and transferred to resist rollers 33. The resist rollers 33 feed the sheet P to between the photosensitive drum 21 and the transfer unit 24 at a timing synchronized with rotation of the photosensitive drum 21.

The charger 22 charges the surface of the photosensitive drum 21 with electrostatic charges. This charging and irradiation of a laser beam on the photosensitive drum 21 form an electrostatic latent image on the photosensitive drum 21.

The developing unit 23 supplies a developer mix to the photosensitive drum 21. The supplied developer mix visualizes the electrostatic latent image on the photosensitive drum 21. The transfer unit 24 transfers the visual image (toner image) on the photosensitive drum 21 onto the sheet P transferred from the resist rollers 33. The transferred sheet P is peeled from the photosensitive drum 21 by the peeling unit 25. The peeled sheet P is transferred to a fixing unit 35 by a convey belt 34.

The fixing unit 35 applies heat to the sheet P to fix the developer mix image on the sheet P. The sheet P having passed through the fixing unit 35 is discharged to a tray 37 by convey rollers 36.

Figure 2:
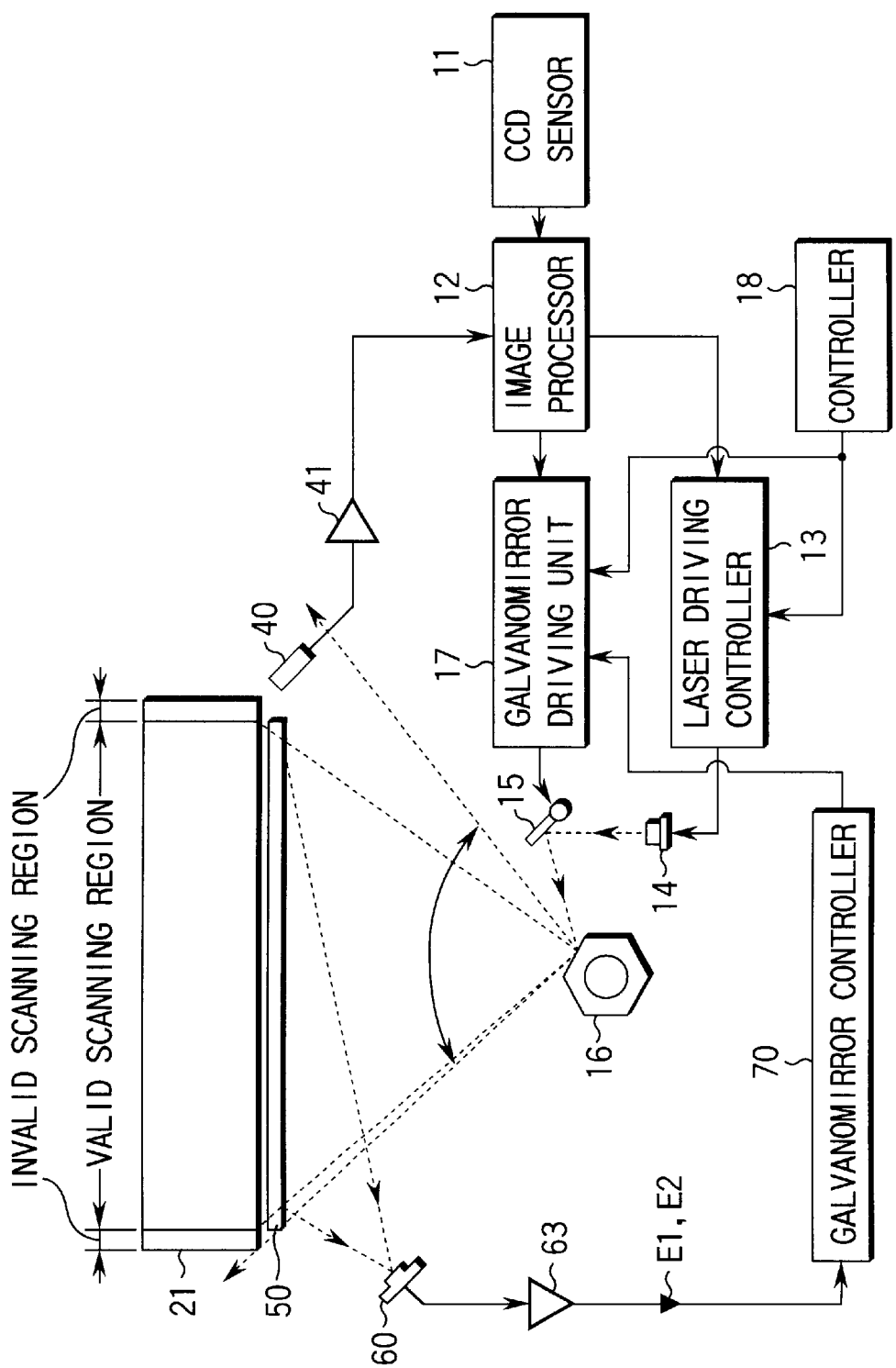
FIG. 2 is a block diagram showing the main part of the first embodiment.

As shown in FIG. 2, the scanning range of a laser beam includes the entire region from one end to the other end of the photosensitive drum 21 in the axial direction, and a predetermined region beyond the other end of the photosensitive drum 21. The entire region from one end to the other end of the photosensitive drum 21 in the axial direction includes a valid scanning region (corresponding to an image formation region) and invalid scanning regions on the two sides of the valid scanning region. A light detector 40 is set in the predetermined region.

The light detector 40 detects the end of one scanning (main scanning). Upon reception of a laser beam, the light detector 40 outputs an electrical signal. This output is supplied to the image processor 12.

The laser driving controller 13 modulates a driving current for driving the laser diode 14 in accordance with image data supplied from the image processor 12.

The galvanomirror 15 is a current-driven type mirror which pivots by a current supplied from the galvanomirror driving unit 17. By pivot of the galvanomirror 15, the laser beam position is adjusted in a direction perpendicular to the main scanning direction.

A controller 18 controls the laser driving controller 13 and galvanomirror driving unit 17.

An optical unit 50 is disposed immediately before a position where a laser beam reflected by the polygon mirror 16 reaches the surface of the photosensitive drum 21.

Immediately before the laser beam scans the photosensitive drum 21, the optical unit 50 focuses part of the laser beam onto one point in a direction different from the direction the laser beam travels. A photoelectric converter 60 is located at this focal position.

The photoelectric converter 60 outputs a current of a level corresponding to the received laser beam quantity. The output is converted into voltage signals (E1 and E2) by an amplifier 63, and the signals are supplied to a galvanomirror controller 70. The galvanomirror controller 70 controls driving of the galvanomirror 15 in accordance with the outputs from the amplifier 63.

Figure 3:
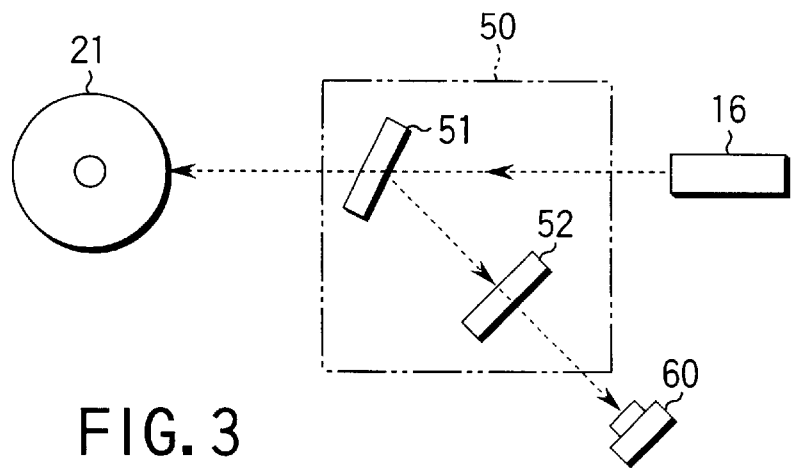
FIG. 3 is a view showing the arrangement of an optical unit and its peripheral units in FIG. 2.
Figure 4:
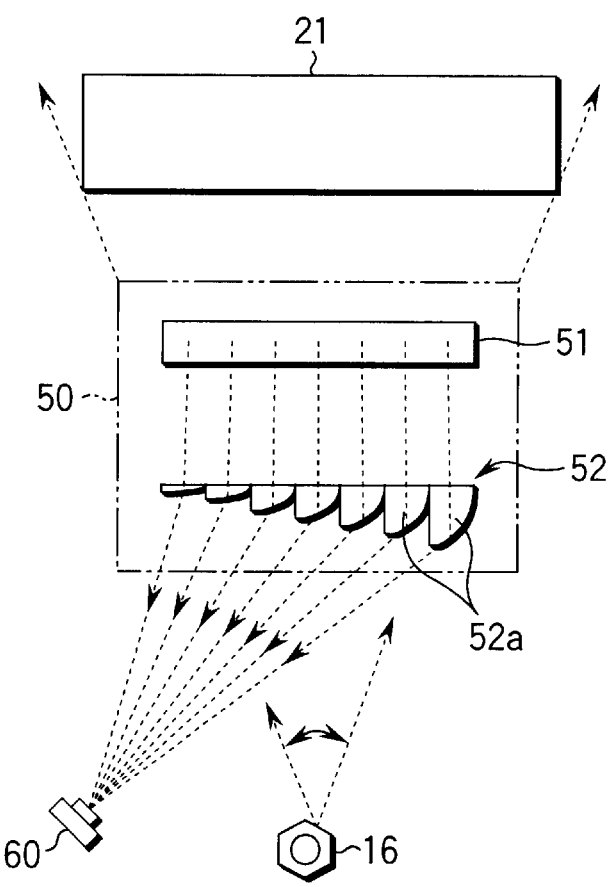
FIG. 4 is a view showing the arrangement of FIG. 3 when viewed from the top.

As shown in FIGS. 3 and 4, the optical unit 50 comprises a half-mirror 51 for deflecting part of a laser beam in a direction different from the traveling direction of the laser beam, and a condenser, e.g., Fresnel lens 52 for focusing the laser beam deflected by the half-mirror 51 onto the photoelectric converter 60. The Fresnel lens 52 is constituted by laying out a plurality of lenses 52a having different polarizing angles as polarizers in the laser beam scanning direction.

Figure 5:
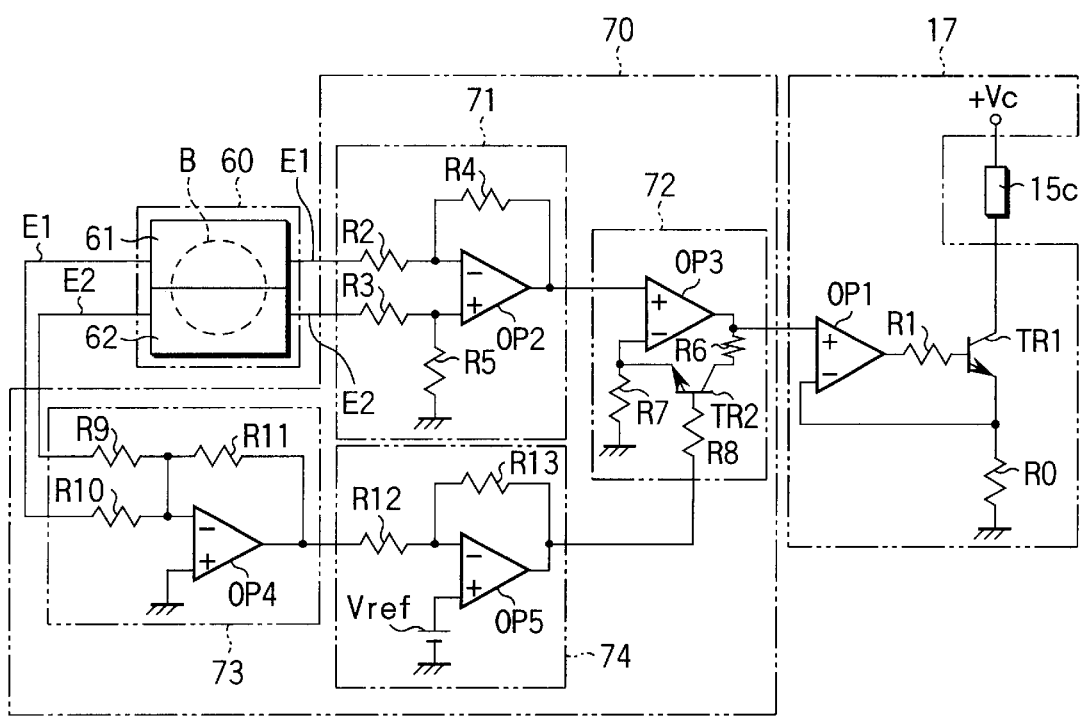
FIG. 5 is a block diagram showing a galvanomirror driving unit and galvanomirror controller in the first embodiment.

FIG. 5 shows detailed arrangements of the photoelectric converter 60, galvanomirror controller 70, and galvanomirror driving unit 17.

The galvanomirror driving unit 17 supplies, to a driving coil 15c of the galvanomirror 15, a current of a level corresponding to a control signal voltage applied from the galvanomirror controller 70. The galvanomirror driving unit 17 is made up of an operation amplifier OP1, resistors R0 and R1, and transistor TR1.

The photoelectric converter 60 has first and second light-receiving units 61 and 62 juxtaposed next to each other. The light-receiving units 61 and 62 are irradiated with a laser beam B guided from the optical unit 50, as represented by a broken line. If the irradiation region of the laser beam B uniformly corresponds to the light-receiving units 61 and 62, the voltages E1 and E2 based on outputs from the light-receiving units 61 and 62 are at the same level. If the irradiation region of the laser beam B shifts to the light-receiving unit 61, the level of the voltage E1 based on the output from the light-receiving unit 61 is higher than that of the voltage E2 based on the output from the light-receiving unit 62. If the irradiation region of the laser beam B shifts to the light-receiving unit 62, the level of the voltage E2 based on the output from the light-receiving unit 62 is higher than that of the voltage E1 based on the output from the light-receiving unit 61.

The galvanomirror controller 70 detects the difference between the voltage E1 based on the output from the light-receiving unit 61 and the voltage E2 based on the output from the light-receiving unit 62, and executes closed-loop control for a driving current to the galvanomirror 15 in a direction in which the difference is eliminated. At the same time, the galvanomirror controller 70 corrects the gain of the closed-loop control in accordance with the sum of the voltages E1 and E2. The galvanomirror controller 70 comprises a difference detection circuit 71, amplification circuit 72, sum detection circuit 73, and gain correction circuit 74.

The difference detection circuit 71 outputs a voltage of a level corresponding to the difference between the voltages E1 and E2, and is made up of an operation amplifier OP1, and resistors R2, R3, R4, and R5. The amplification circuit 72 amplifies the output voltage of the difference detection circuit 71 at a predetermined gain G, and is made up of an operation amplifier OP3, resistors R6, R7, and R8, and transistor TR2. The sum detection circuit 73 outputs a voltage of a level corresponding to the sum of the voltages E1 and E2, and is made up of an operation amplifier OP4, and resistors R9, R10, and R11. The gain correction circuit 74 controls a feedback current in the amplification circuit 72 in accordance with the output voltage of the sum detection circuit 73, thereby correcting the gain G of the amplification circuit 72. The gain correction circuit 74 is made up of an operation amplifier OP5, resistors R12 and R13, and constant-voltage power supply Vref.

The operation of the electronic copying machine having this arrangement will be explained.

If the irradiation region of the laser beam B guided to the photoelectric converter 60 by the optical unit 50 uniformly corresponds to the light-receiving units 61 and 62, the voltages E1 and E2 based on outputs from the light-receiving units 61 and 62 are at the same level. At this time, the output voltage of the difference detection circuit 71 is 0.

Figure 6:
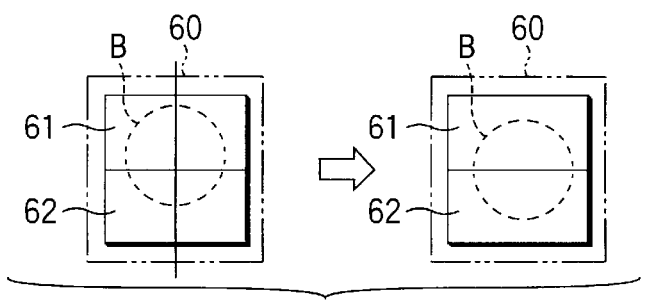
FIG. 6 is a view for explaining a change in position of a laser beam projected on a photoelectric converter in the first embodiment.

If the irradiation region of the laser beam B guided to the photoelectric converter 60 by the optical unit 50 shifts to the light-receiving unit 61, the level of the voltage E1 based on the output from the light-receiving unit 61 is higher than that of the voltage E2 based on the output from the light-receiving unit 62. At this time, the difference detection circuit 71 outputs a negative voltage, which is amplified by the amplification circuit 72 at the predetermined gain G. A current of a level corresponding to the output voltage of the amplification circuit 72 flows through the driving coil 15c of the galvanomirror 15 to pivot the galvanomirror 15 in one direction. By this pivot, the laser beam B moves in a direction perpendicular to main scanning. A change in irradiation region of the laser beam B under this control is shown in FIG. 6.

If the irradiation region of the laser beam B guided to the photoelectric converter 60 by the optical unit 50 shifts to the light-receiving unit 62, the level of the voltage E2 is higher than that of the voltage E1. At this time, the difference detection circuit 71 outputs a positive voltage, which is amplified by the amplification circuit 72 at the predetermined gain G. A current of a level corresponding to the output voltage of the amplification circuit 72 flows through the driving coil 15c of the galvanomirror 15 to pivot the galvanomirror 15 in the other direction. By this pivot, the laser beam B moves in a direction perpendicular to main scanning.

Since the galvanomirror 15 always undergoes closed-loop control, the laser beam position can always be automatically adjusted to an optimal position in a direction perpendicular to the main scanning direction regardless of vibrations or changes in ambient temperature. Accordingly, a high-quality image with fine finish can always be formed.

In a multi-beam type electronic copying machine for forming an image using a plurality of laser beams, the interval between respective laser beams can always be kept at a proper value. High reliability can be ensured for high-density image formation.

Figure 7:
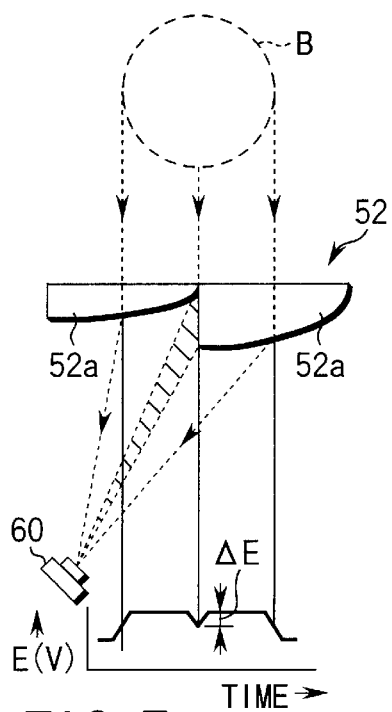
FIG. 7 is a view showing light loss generated in a Fresnel lens in the first embodiment.
Figure 8:
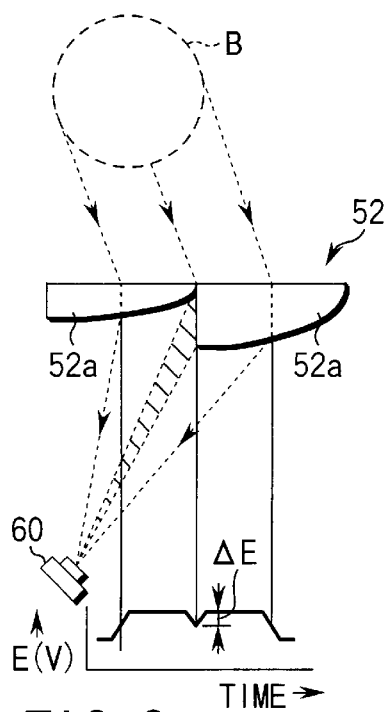
FIG. 8 is a view showing light loss generated in a Fresnel lens in the first embodiment.

FIGS. 7 and 8 respectively show states in which the laser beam B is focused on the photoelectric converter 60 by the Fresnel lens 52. In the example of FIG. 7, the laser beam B is perpendicularly incident on the Fresnel lens 52. In the example of FIG. 8, the laser beam B is obliquely incident on the Fresnel lens 52.

The Fresnel lens 52 is formed from an array of a plurality of lenses 52a. When the laser beam B is incident across two adjacent lenses 52a, the beam does not pass through the boundary between the two lenses 52a, and light loss or drop off occurs in a hatched region shown in FIG. 7 or 8. That is, when the laser beam B corresponds to the boundary between two lenses 52a, the quantity of laser beam B guided to the photoelectric converter 60 distorts in the decreasing direction, and an output voltage E (=E1+E2) of the photoelectric converter 60 drops by ΔE. This voltage drop adversely influences closed-loop control of the galvanomirror 15.

To prevent this, the sum (=E) of the voltages E1 and E2 based on outputs from the light-receiving units 61 and 62 is detected to correct the gain G of the amplification circuit 72 in accordance with the sum. This correction always keeps the gain G of the amplification circuit 72 constant regardless of light loss (distortion of the beam quantity) generated in the Fresnel lens 52. Therefore, closed-loop control of the galvanomirror 15 can always be executed with high precision.

Figure 9:
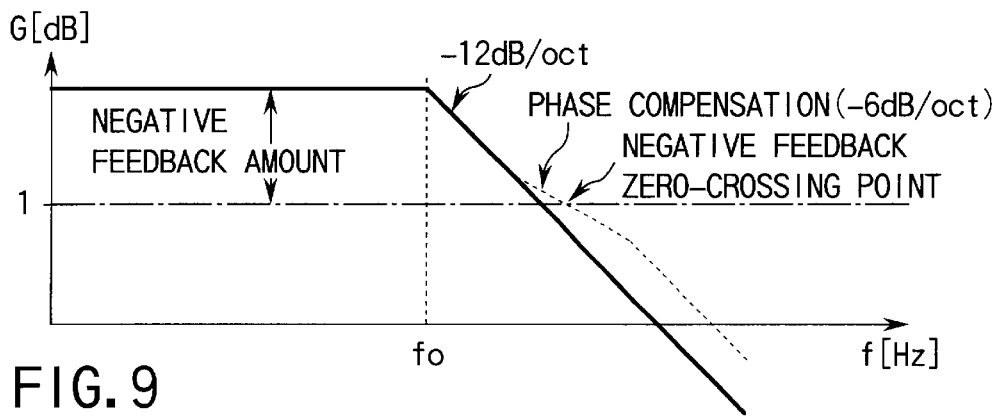
FIG. 9 is a graph showing the frequency characteristic of a galvanomirror in the first embodiment.

FIG. 9 shows the frequency characteristic of the galvanomirror 15. Reference symbol f denotes the frequency; and fo, the cutoff frequency. In closed-loop control of the galvanomirror 15, phase compensation is done for the frequency characteristic, but the frequency characteristic varies depending on the gain G of closed-loop control. On the other hand, the sum (=E) of the voltages E1 and E2 is the proportionality constant of the gain G. For this reason, the sum (=E) of the voltages E1 and E2 is detected to correct the gain of closed-loop control in accordance with the sum.

This correction greatly improves the accuracy and reliability of closed-loop control of the galvanomirror 15. In this respect as well, a high-quality image with fine finish can be formed.

[2] The second embodiment will be described.

Figure 10:
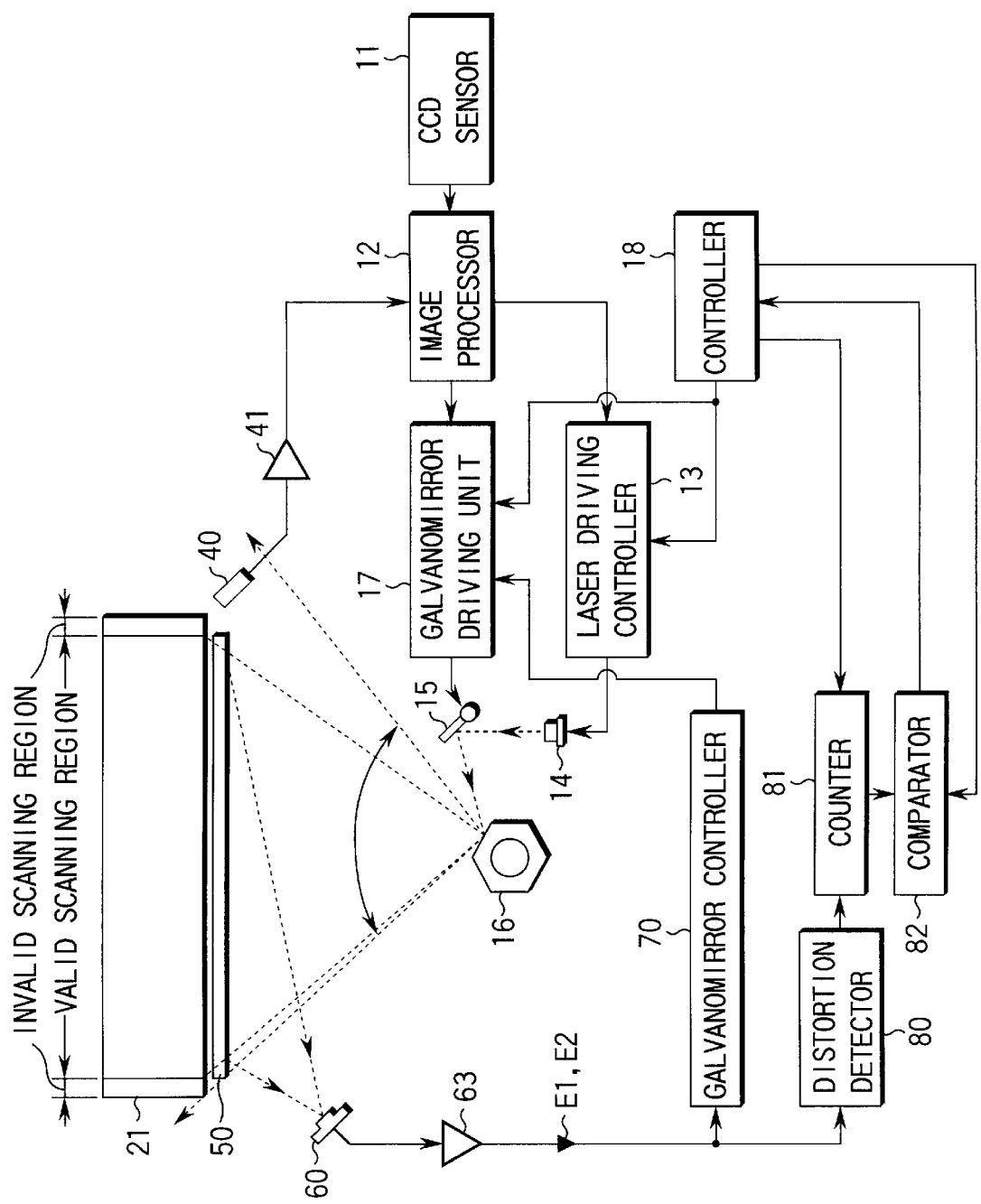
FIG. 10 is a block diagram showing the main part of the second embodiment.
Figure 11:
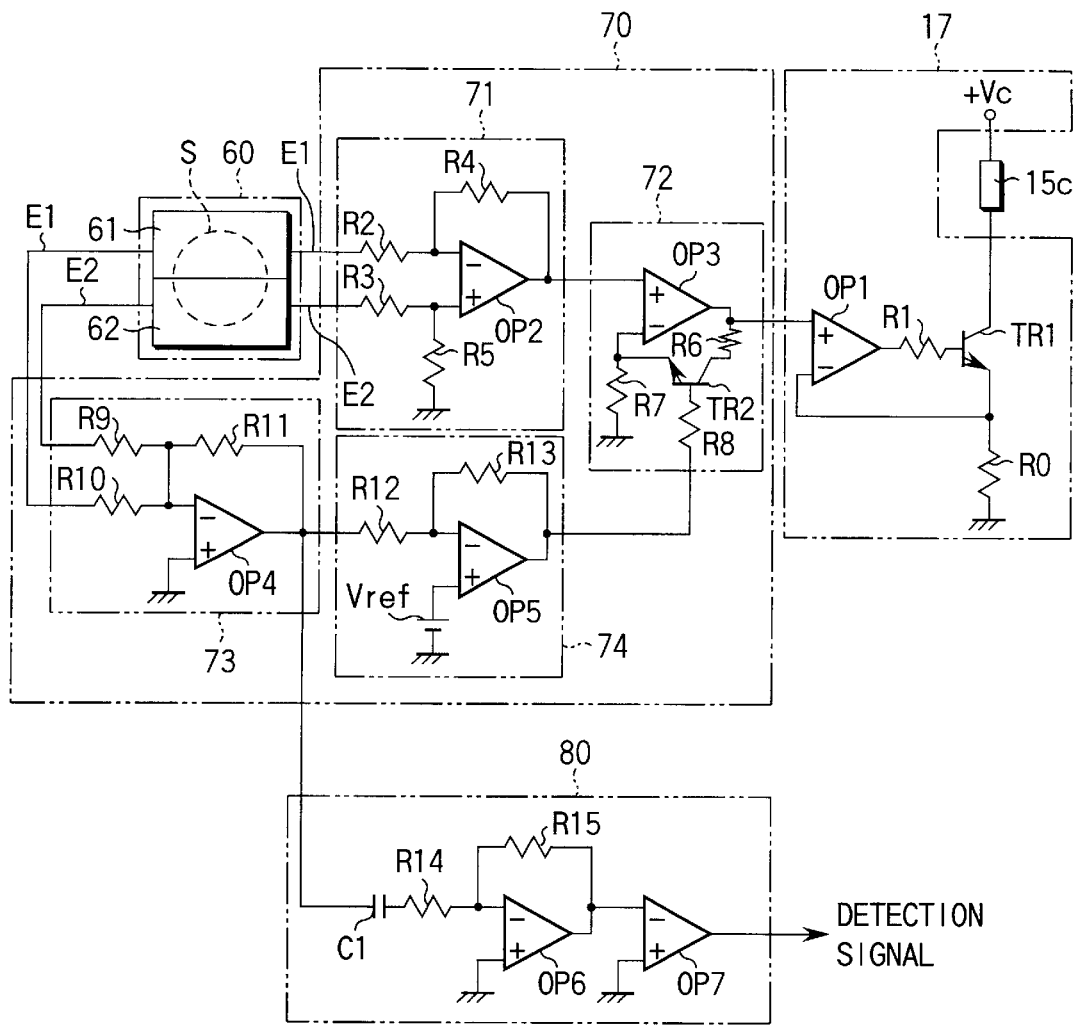
FIG. 11 is a block diagram showing a galvanomirror driving unit, galvanomirror controller, and distortion detector in the second embodiment.

As shown in FIG. 10, output voltages E1 and E2 of an amplifier 63 based on the output from a photoelectric converter 60 are supplied to a distortion detector 80. The distortion detector 80 detects light loss generated at the boundary between respective lenses 52a of a Fresnel lens 52, i.e., distortion of the quantity of laser beam guided to the photoelectric converter 60. As shown in FIG. 11, the distortion detector 80 is comprised of operation amplifiers OP6 and OP7, capacitor C1, and resistors R14, R15, and R16.

Figure 12:
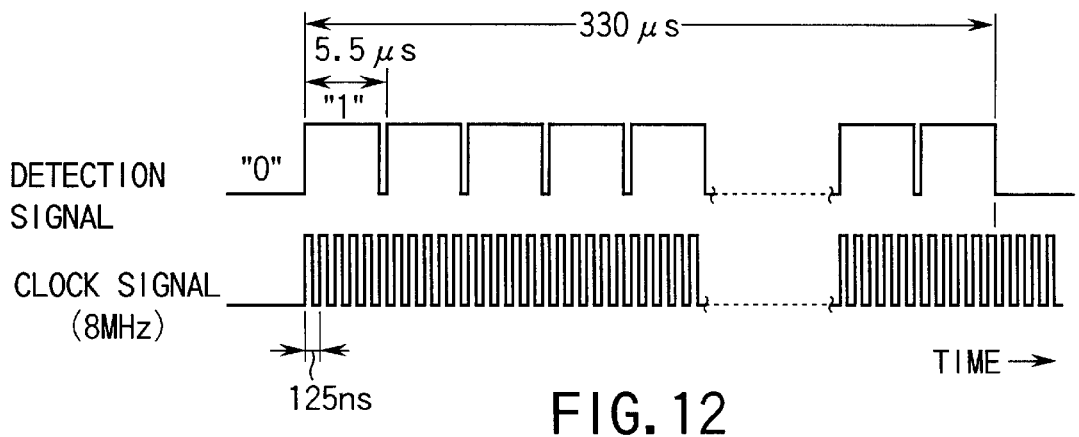
FIG. 12 is a signal waveform chart for explaining the operation of the second embodiment.

When the main scanning period of the laser beam is 330 μs, and the Fresnel lens 52 has 60 lenses 52a, distortion of the beam quantity is detected every 5.5 μs. In this case, as shown in FIG. 12, a pulse wave signal having a period of 5.5 μs is output as a detection signal from the distortion detector 80. The detection signal is supplied to a counter 81.

On the other hand, a clock signal having a frequency of 8 MHz is output from a controller 18, and supplied to a comparator 82. As a reference value for the count value of the counter 81, data of a numerical value "44 (=5.5 μs/125 ns)" is supplied to the counter 81.

During one period (5.5 μs) of the detection signal, the counter 81 counts the number of clock signals. The comparator 82 sequentially compares the count value of the counter 81 with the numerical value "44". The comparison result is supplied to the controller 18.

The controller 18 determines based on the comparison result from the counter 81 whether the pivot speed of a polygon mirror 16 is proper. If the count value is equal to the numerical value "44", the controller 18 determines that the pivot speed of the polygon mirror 16, i.e., the main scanning speed of the laser beam is proper. If the count value is larger than the numerical value "44", the controller 18 determines that the pivot speed of the polygon mirror 16, i.e., the main scanning speed of the laser beam is lower than a prescribed value. If the count value is smaller than the numerical value "44", the controller 18 determines that the pivot speed of the polygon mirror 16, i.e., the main scanning speed of the laser beam is higher than the prescribed value. The determination result is reflected on driving control of the polygon mirror 16 to adjust the main scanning speed of the laser beam to the prescribed value.

Since distortion of the beam quantity caused by the structure of the Fresnel lens 52 can be detected to determine the main scanning speed of the laser beam, the reliability of image formation is further improved. The remaining arrangement, operation, and effects are the same as those of the first embodiment.

[3] The third embodiment will be described.

Figure 13:
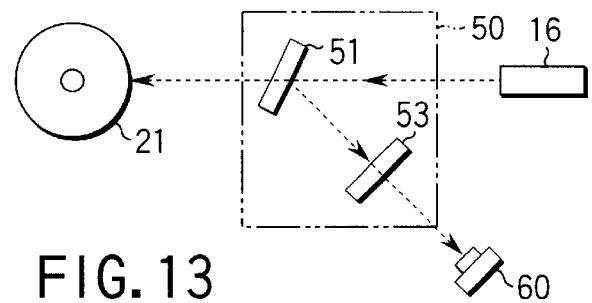
FIG. 13 is a view showing the arrangement of an optical unit and its peripheral units in the third embodiment.
Figure 14:
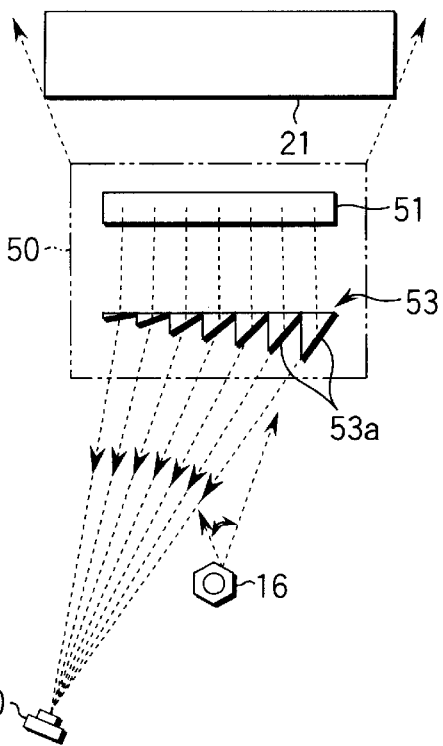
FIG. 14 is a view showing the arrangement of FIG. 13 when viewed from the top.

Although the first and second embodiments adopt the Fresnel lens 52 as the condenser of the optical unit 50, the third embodiment adopts a prism array 53 as the condenser, as shown in FIGS. 13 and 14.

The prism array 53 is constituted by laying out a plurality of prisms 53*a* having different polarizing angles as polarizers in the laser beam scanning direction. The prism array 53 has the same function as that of the Fresnel lens 52.

The remaining arrangement, operation, and effects are the same as those of the first or second embodiment.

[4] The fourth embodiment will be described.

Figure 15:
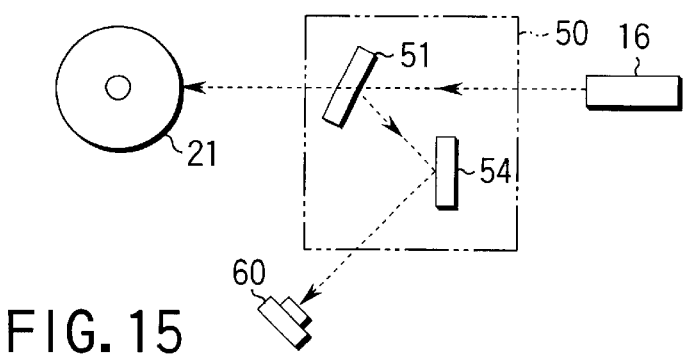
FIG. 15 is a view showing the arrangement of an optical unit and its peripheral units in the fourth embodiment.
Figure 16:
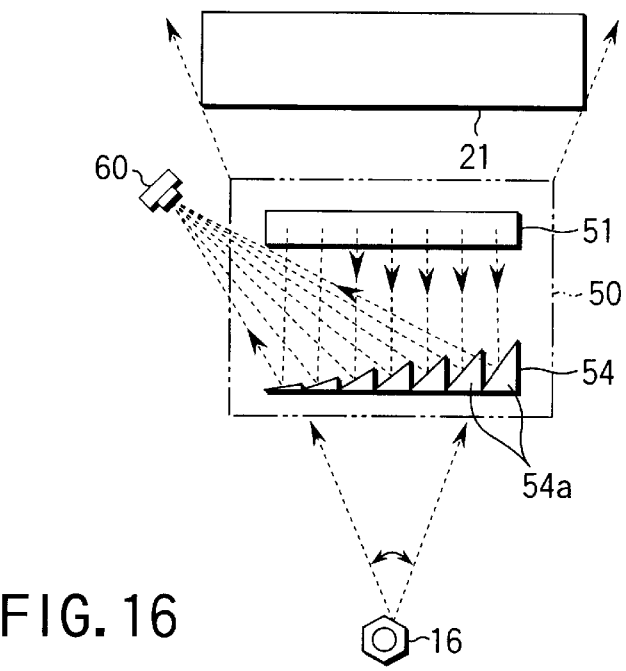
FIG. 16 is a view showing the arrangement of FIG. 15 when viewed from the top.

The fourth embodiment employs a mirror array 54 as the condenser of an optical unit 50, as shown in FIGS. 15 and 16.

The mirror array 54 is constituted by laying out a plurality of mirrors 54*a* having different polarizing angles as polarizers in the laser beam scanning direction.

The remaining arrangement, operation, and effects are the same as those of the first or second embodiment.

Figure 17:
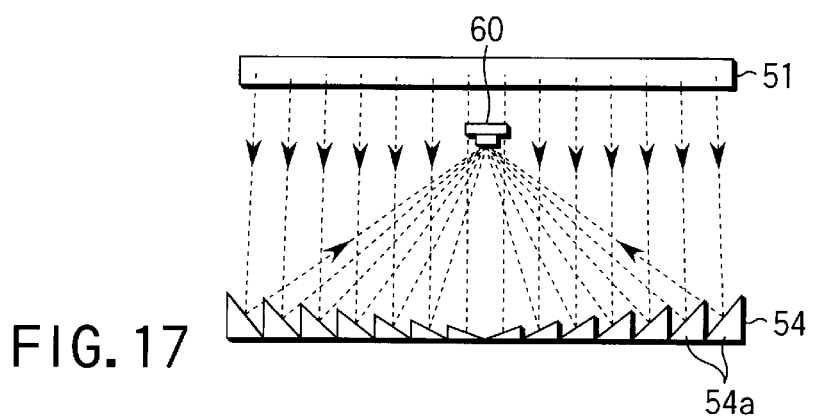
FIG. 17 is a view showing a modification of a mirror array in FIG. 15 when viewed from the top.

The fourth embodiment may employ a mirror array 54 having a shape shown in FIG. 17.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus for scanning an image carrier with a laser beam emitted by a semiconductor laser, comprising:

an adjuster for adjusting a position of the laser beam in a direction perpendicular to the scanning direction;

an optical unit for focusing onto one point part of the laser beam immediately before it scans the image carrier;

a photoelectric converter arranged at a position where the laser beam is brought to a focus by said optical unit; and control means for controlling said adjuster in accordance with an output from said photoelectric converter, wherein said optical unit comprises a half-mirror for deflecting part of the laser beam in a direction different from a traveling direction of the laser beam, and a condenser for focusing the laser beam deflected by said half-mirror onto said photoelectric converter, wherein said condenser comprises a plurality of polarizers laid out in the scanning direction, and wherein said image forming apparatus further comprises:
detection means for detecting distortion of a quantity of laser beam guided from said condenser to said photoelectric converter; and
determination means for determining based on a detection result of said detection means whether a scanning speed of the laser beam is proper.

2. An image forming apparatus according to claim 1, wherein said photoelectric converter comprises first and second light-receiving units juxtaposed next to each other, and said control means controls said adjuster so as to eliminate a difference between an output from said first light-receiving unit and an output from said second light-receiving unit.

3. An image forming apparatus according to claim 1, wherein said adjuster is a current-driven type galvanomirror, said photoelectric converter comprises first and second light-receiving units juxtaposed next to each other, and said control means detects a difference between an output from said first light-receiving unit and an output from said second light-receiving unit, executes closed-loop control for a driving current to said adjuster in a direction in which the difference is eliminated, and corrects a gain of the closed-loop control in accordance with a sum of the output from said first light-receiving unit and the output from said second light-receiving unit.

4. A method of controlling an image forming apparatus for scanning an image carrier with a laser beam emitted by a semiconductor laser, comprising the steps of:

focusing onto a photoelectric converter part of the laser beam immediately before it scans the image carrier, and adjusting a position of the laser beam in a direction perpendicular to a scanning direction of the laser beam in accordance with an output from the photoelectric converter, wherein the focusing step includes deflecting a part of the laser beam by a half-mirror in a direction different from a travelling direction of the laser beam and using a condenser for focusing the laser beam deflected by the laser beam onto said photoelectric converter, said converter including a plurality of polarizers laid out in the scanning direction, and wherein the method further comprises the steps of:
detecting distortion of a quantity of the laser beam guided from said condenser to said photoelectric converter, and
determining, based on a distortion detecting result, whether a scanning speed of the laser beam is proper.

* * * * *